J. W. UNDERWOOD.
SUPPORT OF MOTOR CYCLE SIDE CARS.
APPLICATION FILED OCT. 31, 1916.
1,224,047.
Patented Apr. 24, 1917.
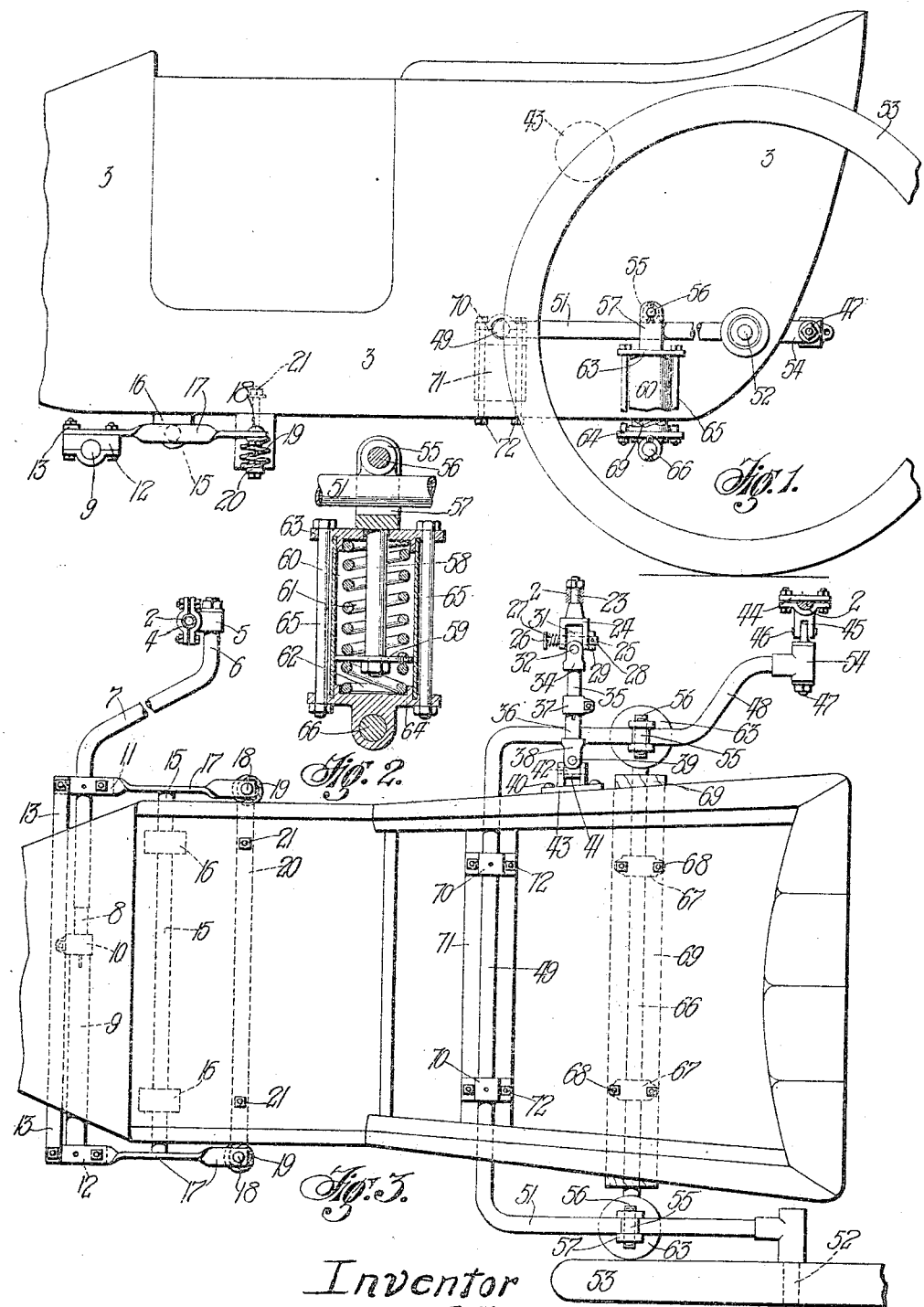
Inventor
J. W. Underwood

UNITED STATES PATENT OFFICE.

JOHN W. UNDERWOOD, OF MELBOURNE, VICTORIA, AUSTRALIA.

SUPPORT OF MOTOR-CYCLE SIDE CARS.

1,224,047.

Specification of Letters Patent.

Patented Apr. 24, 1917.

Application filed October 31, 1916. Serial No. 128,748.

*To all whom it may concern:*

Be it known that I, JOHN WALTER UNDERWOOD, a subject of the King of Great Britain and Ireland, and a resident of the city of Melbourne, in the county of Bourke, State of Victoria, Commonwealth of Australia, and whose post-office address is 419 Lonsdale street, in the said city of Melbourne, have invented certain new and useful Improvements in and Connected with the Support of Motor-Cycle Side Cars, of which the following is a specification.

This invention relates to motor cycle side cars and particularly aims at minimizing the effect of road shocks to obtain increased comfort for both the rider and the passenger.

Hitherto many arrangements of springs have been proposed, but shocks encountered by the side car wheel have usually affected the motor cycle rider's comfort as well as that of the passenger, and shocks encountered by the back wheel of the cycle have affected the passenger as well as the rider, particularly when the said back wheel has been mounted in hinged stays provided with sensitive shock absorbing springs.

By the present invention the manner of springing the side car is such that shocks are not communicated to and from the side car as formerly and shocks encountered by the motor cycle back wheel are reduced by the springs of the side car. In addition a motor cycle equipped with a spring frame is not at a disadvantage as the cycle frame and its back wheel may rise and fall without discomfort to the side car passenger. With some shock absorbers driving is often rendered difficult owing to the motor cycle tending to incline toward the side car when a shock is encountered by the said cycle. The features of novelty of the invention are pointed out in the appended claims.

Referring to the drawings which form part of this specification:—

Figure 1 is a side elevation of the outer side of a side car equipped with the invention. Portions are broken away for convenience of illustration.

Fig. 2 is an enlarged sectional view of a shock absorber, one of which is employed at each side of the side car.

Fig. 3 is a plan of Fig. 1, the seat of the side car being removed and parts broken away for convenience of illustration.

The invention includes an under-carriage for a motor cycle side car which has three connections to the frame of the cycle, a front connection consisting of a half crank connection, a double universal joint connection and a back crank connection.

On reference to the drawings it will be seen that 2 represents the cycle frame and 3 the body of the side car.

To the cycle frame is secured a clamp 4 supporting bearing 5. In this bearing 5 turns the end of a crank shaft 6 from which extends a crank arm 7. This crank arm has a crank pin having a telescoping portion 8. Around this passes a tubular split crank pin extension 9 secured by a clamp 10. In the extension is a recessed bearing. Around the crank pin is an inner bearing 11 and engaging in the recessed portion before referred to is an outer bearing 12. Between the two bearings is bolted a tie rod 13. To each bearing is attached the front half twisted end of a rocking lever 17. These levers are attached to the rocking shaft 15. Bearings 16 surround the rocking shaft and by bolts are secured to the bottom of the body 3.

The rear ends of the said rocking levers are half twisted. Through each inner end passes a bolt 18, securing the upper end of a stranded coiled spring 19. Each upper end of the stranded coil spring is bolted to a cross rod 20, which by bolts 21 is secured to the bottom of the body 3. The aforementioned parts are all included in the first connection to the cycle frame.

The second connection is made by a double universal joint in which is a threaded stem 23 secured to a first fork 24. Through this fork passes a first pin 25. This has an extended body and a head 26 against the inside of which head is a coiled spring 27. Through the other end of the pin is an elongated slotway across which passes a pivot pin 28 to which is pivoted a cotter plate 29. This cotter plate is of such a character that when the head of the bolt compresses the spring against the fork the plate can be turned in a line with the pin 25 and the said pin and cotter plate can be withdrawn from the first fork 24.

Pivoted to the first pin 25 is a first block 31. In this turns a second pin 32 secured to a second fork 34. The second fork is secured to a telescoping rod 35 which telescopes into a tubular split rod 36 secured by a clamp 37. Upon this tubular split rod is a third fork 38 through which passes a third pin 39. This turns within a second block 41 in which there also turns a fourth pin 42. This fourth pin is carried by forks secured to a plate 43 which plate by bolts 40 is secured to a side of the body 3.

The above connecting parts form the second connection.

The third connection is made by a clamp 44 from which protrudes a fork 45 in which is a first pivot pin 46. To the first pivot pin 46 is pivoted a stud pin 47, around which turns a bearing 54 secured at the inner end of an inner crank arm 48. From this crank arm 48 extends a crank pin 49 and at the other end of the crank pin is an outer crank arm 51. To this outer crank arm 51 is secured an axle 52 upon which turns the side car wheel 53.

To the inner crank arm 48 and the outer crank arm 51 is attached a bearing 55 (Fig. 2). Each bearing 55 accommodates a pin 56 at the top of a fork 57. To the fork 57 it attached the upper end of a plunger rod 58 to the bottom of which is secured a plate 59. An upper coiled spring 61 surrounds the upper portion of the plunger rod and beneath it is a lower spring 62. Above the top of the upper spring is a top plate 63 and beneath the lower spring is a lower plate 64. These two plates are connected by uniting bolts 65. Extending between the two plates is a casing 60. A bearing hole exists in the lower plate to accommodate the cross pin 66, which is supported by caps 67 through which pass bolts 68 which also pass through a block 69 and secure the said cross pin beneath the bottom of the body. From the foregoing it will be seen that a shock absorber is disposed between each of the crank arms 48 and 51 and the cross pin 66.

Suitable holes are made in each side of the body to pass the crank pin 49. To the crank pin are attached bearings 70 which in turn are united to a block 71 secured to the bottom of the body 3 by bolts 72.

With this invention an extremely flexible connection of the side car to the cycle is provided. The side car may be quickly attached to or detached from the cycle by means of the clamps 4 and 44 and the removable pin 25. Upon a passenger entering the side car the body 3 descends or approaches the ground. The cross pin 66 descends with the body and carries with it the lower plates 64 of the shock absorbers. The tie bolts 65 cause the upper plates 63 to descend also and compress the springs 61 against the plates 59 of the plunger rods 58 which are stationary. Upon either the side car wheel 3 or the rear wheel of the motor cycle encountering an obstacle or road inequality the wheel rises causing the rear ends of the inner and outer crank arms 48—51 to rise the crank pin 49 pivoting in the bearings 70 carried by the side car. As the crank arms rise they lift the plunger rods 58 compressing the springs 61 between the plates 59 and the top plates of the shock absorber. Any recoil is absorbed by the recoil springs 62. The front end of the side car body is resiliently supported by the stranded springs 19 and any vertical movement or bumping of the front wheel of the cycle is absorbed by said springs through the rocking levers 17. The stranded conformation of the springs 19 provides increased resiliency and prevents collapse should any one of the strands become ruptured. The telescoping members 18 and 35 provide for variations in the distance between the side car and the cycle.

Having now described my invention what I claim as new and desire to secure by Letters Patent is:—

1. In combination, a side car, means for supporting one end of the side car, inner and outer crank arms pivotally mounted thereon to support the opposite end of the side car, a supporting wheel carried by the outer crank arm, and shock absorbers connected to said crank arms and to the side car.

2. In combination a side car, means for supporting one end of the side car, a crank pin extending across and pivotally mounted on said side car, inner and outer crank arms extending from said crank pin, a supporting wheel carried by the outer crank arm, a flexible connection between the inner crank arm and the cycle frame and shock absorbers between each of the crank arms and the side car.

3. In combination a side car, means for supporting one end of the side car, a crank pin extending across and pivotally mounted on the said side car, inner and outer crank arms extending rearwardly from said crank pin, a supporting wheel carried by the outer crank arm, a clamp flexibly connected to the inner crank arm, a cross pin carried by the side car, and a shock absorber connected to each of the crank arms and the cross pin.

4. In combination a side car, means for supporting one end of the side car, bearings carried thereby, a crank pin capable of turning in said bearings, inner and outer crank arms extending from said crank pin, a supporting wheel carried by the outer crank arm, a bearing carried by the inner crank arm, a stud pin in said bearing, a clamp pivoted to said stud pin, a bearing carried by each of said crank arms, a pin accommodated by each bearing, a fork connected to each of said pins, a plunger rod carried by said fork, a plate carried by the plunger rod, a cross pin carried by the side car, lower shock absorber plates connected to said cross pin, upper shock absorber plates bolted to said lower plates, a spring between each upper plate and the plate of the plunger rod and a recoil spring between each last mentioned plate and the lower shock absorber plate.

5. In the support of motor cycle side cars, a telescoping rod, a universal joint connecting the inner end of said rod to the side car, a universal joint at the outer end of said telescoping rod, means connected to said last mentioned universal joint for attachment to the cycle frame, and means for disconnecting said attaching means from the telescoping rod.

6. In the support of motor cycle side cars, a plate carried by the side car body, a tubular split rod connected by a universal joint to said plate, a clamp carried by said split rod, a telescoping rod engaging said split rod, a universal joint at the outer end of said telescoping rod, a removable pin forming one of the pivots of said universal joint, a spring controlling said pin, a pivoted cotter plate carried by said pin and a threaded shank pivoted to said pin.

7. In the support of motor cycle side cars, the combination with a side car, of rocking levers pivoted to the front portion thereof, springs connected to said levers and to the side car, a crank arm connected to said levers and means for pivotally connecting said crank arm to the frame of the cycle.

8. In the support of motor cycle side cars, the combination with a side car, of a rocking shaft extending across and pivotally mounted on the front of said car, rocking levers carried by said rocking shaft, springs connected to said levers and to the side car, a crank pin pivotally connected to said levers, a crank arm extending from said crank pin, and a clamp pivotally connected to said crank arm.

9. In the support of motor cycle side cars, the combination with a side car, of a rocking shaft carried by the front of said side car, rocking levers carried by said rocking shaft, springs connected to one end of said levers and to the side car, bearings carried by the opposite end of said levers, a crank pin pivotally mounted in said bearings, a crank arm extending from said crank pin, means for adjusting the length of said crank pin and means for pivotally connecting said crank arm to the frame of the cycle.

10. In the support of motor cycle side cars, the combination with a side car, of a rocking shaft pivotally mounted thereon, a rocking lever at each end of said shaft, a cross rod attached to the side car, stranded coil springs between said cross rod and one end of the rocking levers, bearings carried by the opposite end of the rocking levers, a telescoping crank pin pivotally mounted in one of said bearings, a tubular crank pin extension mounted in the other of said bearings, a clamp carried by said crank pin extension, a crank arm extending from the crank pin, a bearing loosely mounted on said crank arm and a clamp carried by said bearing.

11. In the support of motor cycle side cars, the combination of a side car, a crank pin mounted on the front portion of said side car, a crank arm extending from said crank pin, means for connecting said crank pin to the cycle frame, a second crank pin mounted on the side car behind the first mentioned crank pin, crank arms extending from said second crank pin, a supporting wheel carried by one of the crank arms, means for connecting the other of said crank arms to the cycle frame, and shock absorbers interposed between the latter inner and outer crank arms and the side car.

12. In the support of motor cycle side cars, the combination of a side car, a rear crank pin pivotally connected to said car, inner and outer crank arms extending from said crank pin, a supporting wheel carried by the outer crank arm, a flexible connection carried by the inner crank arm, a cross pin carried by the rear portion of the side car, a shock absorber connected to each of said crank arms and the cross pin, a telescoping rod connected by a universal joint to the side car, a removable connection connected by a universal joint to said telescoping rod, a rocking shaft carried by the front portion of the side car, rocking levers carried by said rocking shaft, springs connected to said rocking levers and to the side car, bearings carried by said levers, a telescoping crank pin pivotally mounted in said bearings, a crank arm extending from said pin and a clamp pivotally mounted on said crank arm.

13. In combination, a side car, a support at the front of the side car including a crank and shock absorbing means associated therewith, a rod extending across the side car and provided at its ends with cranks, a wheel mounted on one of the cranks, the other crank having a pivotal connection for attachment to a motor cycle, shock absorbers between the cranks on the rod and the side car, and a universal connection extending from the side car for attachment to a motor cycle.

14. In combination, a side car, a vertical yieldable support extending laterally from the front of the side car, a support extending from the rear portion of the side car, a wheel on the outer end of the rear support, a pivotal connection on the inner end of the rear support, shock absorbers between the rear support and the side car, and a universal connection extending laterally from the upper portion of the side of the side car for attachment with a motor cycle.

15. In combination, a side car, a rod mounted on the side car, arms mounted at the ends of the rod and extending beyond each side thereof, a support on the side car in rear of the rod, springs interposed between the support and the rear ends of the arms, a cranked rod in front of the rod, the front ends of the arms being secured to the cranked rod, a connection at the end of the rod for attachment to a motor cycle, means at the rear end of the side car for attachment to a motor cycle, shock absorbing means between the rear attaching means and the side car, and a universal connection extending laterally from the upper portion of the side of the side car for attachment to a motor cycle.

16. In combination, a side car, a resiliently mounted support extending laterally from one side of the front of the side car having means at its outer end for attachment to a motor cycle, a substantially U-shaped shaft mounted at the rear under portion of the side car having means at one end for attachment to a motor cycle, and a supporting wheel at its opposite ends, a support extending laterally from opposite sides of the side car, a cushioning device mounted on each laterally extended end of the support, the upper ends of the cushioning devices engaging the legs of the U-shaped shaft, a lateral universal connection extending from the upper portion of the side car between the front support and the U-shaped shaft, and means on the universal connection for attaching the side car to a motor cycle.

In testimony whereof I affix my signature.

J. W. UNDERWOOD.

Copies of this patent may be obtained for five cents each, by addressing the "Commissioner of Patents, Washington, D. C."